United States Patent Office 3,652,603
Patented Mar. 28, 1972

3,652,603
METHOD FOR PRODUCTION OF 2,3-DI(LOWER ALKOXY)-5-METHYL-1,4-BENZOQUINONE
Yutaka Kawamatsu and Hirosada Sugihara, Suita, Osaka, and Hiroshi Morimoto, Nishinomiya, Japan, assignors to Takeda Chemical Industries, Ltd., Osaka, Japan
No Drawing. Filed June 11, 1969, Ser. No. 832,456
Claims priority, application Japan, June 11, 1968, 43/40,151
Int. Cl. C07c *49/64*
U.S. Cl. 260—396 R     10 Claims

ABSTRACT OF THE DISCLOSURE 2,3-di(lower alkoxy) - 5-methyl-1,4-benzoquinones are produced by oxidizing 3,4,5-tri(lower alkoxy) toluene with a peroxide. These materials are useful as starting materials for the synthesis of ubiquinones, the latter compounds which are medicinally important substances used in the electron transferring activity of mitochondria in living tissues.

---

This invention is concerned with a method for producing 2,3 - di(lower alkoxy) - 5-methyl-1,4-benzoquinone, which is useful, for example, as a starting material for the synthesis of ubiquinones and their homologues or analogues.

Ubiquinones and their analogues are medicinally important substances which are involved in the electron transferring activity of mitochondria in the living tissues. 2,3-dimethoxy-5-methyl-1,4-benzoquinone has hitherto been produced by several methods, among which the combination of the following three steps has been considered to be most preferable:

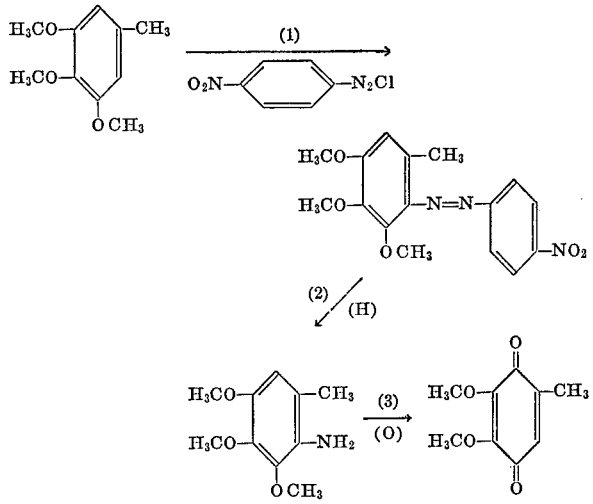

This method surpasses other known methods in employing 3,4,5-trimethoxy toluene which can advantageously be prepared from easily available gallic acid.

However, it entails such shortcomings as requiring so many steps, particularly involving troublesome amination procedures, resulting in poor yield.

It has now been found by the present inventors that the same starting material, 3,4,5-trimethoxy toluene, can be oxidized with a peroxide directly rendering the final product, i.e. 2,3-dimethoxy-5-methyl-1,4-benzoquinone. The present invention is the outgrowth of said finding.

It is the principal object of this invention to produce a 2,3-di(lower alkoxy)-5-methyl-1,4-benznquinone from a 3,4,5-tri(lower alkoxy) toluene by a single process with a good yield without involving troublesome amination processes.

It is to be noted that 2,3-di(lower alkoxy)-5-methyl-1,4-benzoquinone is reduced to give the corresponding hydroquinone and an isoprenoid group is introduced into the 6-position of the hydroquinone, then, oxidized to obtain ubiquinones or their homologues or analogues. Therefore it is another object of this invention to provide an improved means for producing the ubiquinones or their homologues or analogues.

The objects are primarily realized by oxidizing 3,4,5-trimethoxy toluene with a peroxide, which can be formulated as follows:

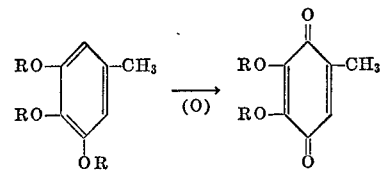

(wherein R is a lower alkyl group).

The starting material, 3,4,5-tri(lower alkoxy)-toluene, can be prepared in an industrial scale, for example, as follows: Gallic acid is alkylated in a conventional manner by a di(lower alkyl) sulfate (e.g. dimethyl sulfate or diethyl sulfate) or a lower alkyl halide (e.g. methyl chloride, methyl bromide, methyl iodide, ethyl iodide, ethyl chloride, ethyl bromide, propyl chloride, propyl bromide, isopropyl chloride or isopropyl bromide) in the presence of alkali, to give a lower alkyl 3,4,5-tri(lower alkoxy) benzoate. The resultant is subjected to reduction sequence, firstly with an alkali metal aluminum hydride (such as lithium aluminum hydride, sodium aluminum hydride) to obtain 3,4,5-tri(lower alkoxy)benzyl alcohol, which is subsequently subjected to catalytic reduction in the presence of a catalyst (such as palladium carbon, platinum, etc.) under an elevated pressure, whereupon 3,4,5-tri(lower alkoxy)toluene is obtained in an excellent overall yield.

In the description throughout the specification, lower alkoxy, lower alkyl and lower alcohol represent those having from 1 to 3 carbon atoms, respectively.

Peroxides which are employable in the method of the present invention include an inorganic peroxide (e.g. hydrogen peroxide, caro's acid, etc.) and an organic peracid (e.g. performic acid, peracetic acid, percaproic acid, perbenzoic acid, pernaphthoic acid, etc.) or a mixture of one or more of them. However, in the present invention, an organic peracid is generally more preferable than inorganic peroxide. As is well known, hydrogen peroxide reacts with an organic acid (e.g. formic acid, acetic acid, caproic acid, benzoic acid, etc.) to give the corresponding organic peracid, and, therefore, a combined use of hydrogen peroxide and the organic acid is recommended as a convenient alternative means to the use of an organic peracid.

While the molar ratio of the peroxide relative to 3,4,5-tri(lower alkoxy)toluene varies with the kind of said raw materials or other reaction conditions, it generally gives satisfactory results to employ 2 to 20 moles per mole of 3,4,5-tri(lower alkoxy)toluene. The reaction proceeds faster as the amount of the peracid increases, but the progress of the reaction can be further enhanced by the addition of a small amount of a mineral acid (e.g. sulfuric acid and hydrochloric acid) to the reaction mixture.

In general, the reaction is carried out in the presence of a suitable solvent which does not disturb the reaction. The solvent can be exemplified by a lower carboxylic acid or its esters (e.g. actic acid, ethyl acetate or the like) a lower alcohol (e.g. methanol, ethanol or the like) an ether (e.g. ether, dioxane, tetrahydrofuran or the like) halogenated hydrocarbon (e.g. chloroform, carbon tetrachloride or the like), water or a mixture thereof.

Generally speaking, the reaction proceeds smoothly at a room temperature (about 10° to 30° C.). However, it may be carried out with cooling or heating, so as to control the reaction velocity.

While the reaction time varies with the reaction conditions, generally speaking, the reaction goes to completion within about one to several days. It is usually preferable that the reaction is conducted under the protection from light, whereby undesirable side reactions are suppressed.

The progress of the reaction can be confirmed by means of thin layer chromatography as well as by the characteristic ultraviolet adsorbtion (at about 265 mμ) of benzoquinones.

After the reaction, the desired product is easily recovered from the reaction mixture, for example, as follows: The reaction mixture is associated with a suitable amount of water and an excess of the peroxide, if any, is decomposed with manganese dioxide and the aqueous mixture is extracted with a non-polar organic solvent such as ether, and the organic layer is washed with a base such as 5% aqueous solution of sodium bicarbonate.

The organic solvent layer is washed with water and dried over anhydrous sodium sulfate. Finally, the solvent is distilled off, whereupon 2,3-di(lower alkoxy)-5-methyl-1,4-benzoquinone is obtained.

The compound can be purified by per se known means (such as various chromatographies, crystallization, recrystallization, distillation under reduced pressure, steam distillation etc.).

Thus purified product is usually obtained in a yield of about 70% of higher relative to the 3,4,5-tri(lower alkoxy)toluene.

Following are presently preferred illustrative embodiments of this invention. In these examples, the parts by weight bear the same relationship to parts by volume as do grams to milliliters. Throughout the specification all percentages are on the weight basis unless otherwise noted.

EXAMPLE 1

In 500 parts by volume of acetic acid are dissolved 91 parts by weight of 3,4,5-trimethoxytoluene, followed by the addition of 100 parts by volume of a 30% aqueous hydrogen peroxide solution. The mixture is shaken and allowed to stand at room temperature in the dark for 8 days. Water and ether are added to the mixture, and extraction is repeated three times with 10,000 parts by volume of ether each. The ether layer is washed twice with 10,000 parts by volume each of 5% aqueous sodium bicarbonate solution and, then, with water. After dehydration over anhydrous sodium sulfate, the ether is distilled off to leave 90 parts by weight of a reddish oil. The oil is chromatographed on a column packed with 10,000 parts by weight of silica gel using a mixture of n-hexane and ether (1:1 by volume) as a developer. The fractions of the first yellow-colored portion are collected, and evaporation of the solvent yields 69 parts by weight of yellowish-red crystals of 2,3-dimethoxy-5-methyl-1,4-benzoquinone. Yield 76%, M.P. 59° C.

$\lambda_{max.}^{EtOH}$ mμ ($E_{1\,cm}^{1\%}$) 265 (923)

*Elementary analysis.*—Calculated for $C_9H_{10}O_4$ (percent): C, 59.33; H, 5.53. Found (percent): C, 59.30; H, 5.48.

EXAMPLE 2

(a) In 500 parts by volume of acetic acid are dissolved 100 parts by weight of 3,4,5-trimethoxytoluene, followed by the addition of 4 parts by volume of a 10% aqueous solution of sulfuric acid and 200 parts by volume of 30% aqueous hydrogen peroxide solution. The mixture is allowed to stand in the dark at room temperature for 2 days. The reaction mixture is treated in the same manner as in Example 1 to obtain 70 parts by weight of yellowish-red crystals of 2,3-dimethoxy-5-methyl-1,4-benzoquinone. Yield 70%.

(b) In 500 parts by volume of methanol are dissolved 100 parts by weight of 3,4,5-trimethoxytoluene, followed by the addition of 4 parts by volume of a 10% aqueous solution of sulfuric acid and 120 parts by volume of a 30% aqueous hydrogen peroxide solution.

The mixture is treated in the same manner as in Example 1 to obtain 2,3 - dimethoxy-5-methyl-1,4-benzoquinone. Yield 40%.

EXAMPLE 3

In 1000 parts by volume of acetic acid is dissolved 224 parts by weight of 3,4,5-triethoxytoluene, followed by the addition of 4 parts by volume of a 10% aqueous sulfuric acid solution and 200 parts by volume of a 30% aqueous hydrogen peroxide solution. The mixture is treated in the same manner as in Example 1 to obtain 161 parts by weight of 2,3-diethoxy-5-methyl-1,4-benzoquinone as reddish oil. Yield 72%

$\lambda_{max.}^{EtOH}$ mμ ($E_{1\,cm}^{1\%}$) 214 (614)

*Elementary analysis.*—Calculated for $C_{11}H_{14}O_4$ (percent): C, 62.84; H, 6.71. Found (percent): C, 63.05; H, 6.80.

EXAMPLE 4

In the same procedure as described in Example 1, one of the organic acids listed below is used in place of acetic acid to give 2,3-dimethoxy-5-methyl-1,4-benzoquinone in the yield as shown.

| Organic acid: | Yield, parts by wt. |
|---|---|
| Caproic acid | 64.4 (70%) |
| Formic acid | 66.2 (72%) |
| n-Propionic acid | 68.1 (74%) |

What is claimed is:

1. A method for producing 2,3-di(lower alkoxy)-5-methyl-1,4-benzoquinone which comprises oxidizing 3,4,5-tri(lower alkoxy)toluene with a peroxide in a lower carboxylic acid solvent of not more than 6 carbon atoms, the molar ratio of the peroxide relative to 3,4,5-tri-(lower alkoxy) toluene being 2 to 20 moles per mol of 3,4,5-tri (lower alkoxy) toluene.

2. A method as claimed in claim 1, wherein the lower alkoxy is methoxy.

3. A method as claimed in claim 1, wherein the lower alkoxy is ethoxy.

4. A method as claimed in claim 1, wherein the peroxide is an organic peracid.

5. A method as claimed in claim 4, wherein the organic peracid is peracetic acid.

6. A method as claimed in claim 4, wherein the organic peracid is performic acid.

7. A method as claimed in claim 4, wherein the organic peracid is perpropionic acid.

8. A method as claimed in claim 4, wherein the organic peracid is percaproic acid.

9. A method as claimed in claim 1, wherein the oxidation is carried out in the presence of a mineral acid.

10. A method as claimed in claim 9, wherein the mineral acid is sulfuric acid.

References Cited

UNITED STATES PATENTS 2,373,003  4/1945  Arnold _____ 260—396 R

JAMES A. PATTEN, Primary Examiner

L. A. THAXTON, Assistant Examiner